(12) United States Patent
Jeong

(10) Patent No.: US 8,397,894 B2
(45) Date of Patent: Mar. 19, 2013

(54) APPARATUS FOR LOCKING SHIFT LEVER OF AUTOMATIC TRANSMISSION IN VEHICLE

(75) Inventor: Wonjin Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 849 days.

(21) Appl. No.: 12/327,697

(22) Filed: Dec. 3, 2008

(65) Prior Publication Data

US 2009/0241718 A1    Oct. 1, 2009

(30) Foreign Application Priority Data

Mar. 27, 2008  (KR) .................. 10-2008-0028376
Jun. 19, 2008  (KR) .................. 10-2008-0057780

(51) Int. Cl.
*B60W 10/10*       (2012.01)
*B60W 10/18*       (2012.01)
*B60K 20/00*       (2006.01)

(52) U.S. Cl. ............... 192/220.3; 192/220.2; 74/473.21

(58) Field of Classification Search .. 74/473.21–473.26; 192/220.2, 220.3

See application file for complete search history.

(56) References Cited

U.S. PATENT DOCUMENTS

| 5,080,208 | A * | 1/1992 | Sakuma et al. ............. 192/220.4 |
| 5,421,792 | A * | 6/1995 | Kataumi et al. ................. 477/99 |
| 6,170,353 | B1 * | 1/2001 | Worner et al. ............. 74/473.21 |
| 6,443,026 | B1 * | 9/2002 | Arakawa et al. ........... 74/473.32 |
| 2004/0194567 | A1 * | 10/2004 | Giefer et al. .................. 74/473.3 |
| 2006/0117893 | A1 * | 6/2006 | Shimizu et al. ............ 74/473.21 |

FOREIGN PATENT DOCUMENTS

| JP | 1178026 | 7/1989 |
| JP | 5208626 | 8/1993 |
| JP | 8207608 | 8/1996 |
| JP | 9-267654 A | 10/1997 |
| JP | 10187261 | 7/1998 |
| JP | 11-254988 A | 9/1999 |
| KR | 10-2004-0040862 A | 5/2004 |
| KR | 10-0461377 B1 | 12/2004 |

* cited by examiner

*Primary Examiner* — William C Joyce
*Assistant Examiner* — Terence Boes
(74) *Attorney, Agent, or Firm* — Morgan, Lewis & Bockius LLP

(57) ABSTRACT

An apparatus for locking a shift lever of an automatic transmission in a vehicle may include a shift lock cam including a position converting member and being connected with a brake pedal wherein the shift lock cam is pivotally coupled to a shift lever housing and elastically supported by a first elastic member, and a shift lock release lever that is pivotally coupled to the shift lever housing and elastically supported by a second elastic member, wherein one end of the shift lock release lever is selectively coupled to a shift lever body and the other end of the shift lock release lever is eccentrically coupled to the position converting member of the shift lock cam.

12 Claims, 9 Drawing Sheets

APPARATUS FOR LOCKING SHIFT LEVER OF AUTOMATIC TRANSMISSION IN VEHICLE

CROSS-REFERENCE TO RELATED APPLICATIONS

The present application claims priority to Korean Patent Application Numbers 10-2008-0028376 and 10-2008-0057780, filed Mar. 27, 2008 and Jun. 19, 2008 respectively, the entire contents of which applications are hereby incorporated for all purposes by this reference.

BACKGROUND OF THE INVENTION

1. Field of the Invention

The present invention relates to an apparatus for locking the shift lever of an automatic transmission in a vehicle.

2. Description of Related Art

In general, the shift lever is positioned around the driver's seat in a vehicle equipped with an automatic transmission and of which a shift lever body is rotatably combined with a shift lever housing to be selectively positioned to a P (parking)-range, an R (reverse)-range, an N (neutral)-range, and a D (drive)-range while moving along a groove of a range formed in the shift lever housing.

Meanwhile, a vehicle equipped with an automatic transmission is also equipped with an apparatus for locking the shift lever to prevent P→R shift or N→R shift of the shift lever unless a driver presses down the brake pedal, such that an accident due to the driver's inattentiveness can be prevented by the apparatus for locking the shift lever.

According to apparatuses for locking the shift lever that have been widely used at present, as a driver presses down the brake pedal, a sensor detects the operation of the brake pedal and transmits the detected result to an ECU (controller), a shift lock solenoid disposed in the shift lever housing is operated by control of the ECU. Further, as the shift lock solenoid operates, a shift lock release lever operates and an end of the shift lock release lever is selectively inserted into a P-range insertion groove or an N-range insertion groove formed in the shift lever. As a result, the operation of P→R shift or N→R shift of the shift lever is prevented.

However, because the apparatuses for locking a shift lever in the related art are formed of an electric or electronic device, the manufacturing cost is high while a noise is considerably made in operation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for locking a shift lever of an automatic transmission in a vehicle having a mechanical structure that is manufactured at a low cost and does not make a noise in operation.

In one aspect of the present invention, an apparatus for locking a shift lever of an automatic transmission in a vehicle, may include a shift lock cam including a position converting member and being connected with a brake pedal wherein the shift lock cam is pivotally coupled to a shift lever housing and elastically supported by a first elastic member, and a shift lock release lever that is pivotally coupled to the shift lever housing and elastically supported by a second elastic member, wherein one end of the shift lock release lever is selectively coupled to a shift lever body and the other end of the shift lock release lever is eccentrically coupled to the position converting member of the shift lock cam.

The first elastic member may provide an elastic force to the shift lock cam in opposite direction of the shift lever body.

The second elastic member may provide an elastic force to the shift lock release lever toward the shift lock cam.

The position converting member may include a first portion, a second portion and a connection portion, the first portion being configured to be disposed higher than the connection portion when the brake pedal is not applied but the second portion being configured to be disposed higher than the connection portion when the brake pedal is applied.

The second portion may be disposed in rearward direction of the connecting portion toward the shift lever body and the first portion is disposed opposite the first portion with respect to the connecting portion.

The connection portion may be coupled to the brake pedal.

The shift lock cam may include a cable connection protrusion that protrudes from one lateral surface thereof to be coupled to the brake pedal, the cable connection protrusion forming the connection portion.

The cable connection protrusion may be coupled to the brake pedal by a shift lock cable.

The position converting member may be configured to be recessed in a track shape on the other lateral surface of the shift lock cam, the position converting member including a lower guide surface and an upper guide surface, wherein one end of the lower guide surface and one end of the upper guide surface are connected each other to form the first portion, and a connecting surface connecting the other end of the upper guide surface with the other end of the lower guide surface, wherein a joint connecting the other end of the lower guide surface and the connecting surface forms the second portion.

The position converting member may be configured to be recessed in a track shape on the other lateral surface of the shift lock cam and formed to be open on upper surface of the shift lock cam and has a lower guide surface, both distal of which include the first and second portions respectively.

The shift lock cam may include a cam rotary shaft protruding from a side thereof such that the second elastic member is fitted on outer circumference of the cam rotary shaft, and a hinge bolt passing through the cam rotary shaft and coupled to the shift lever housing, while functioning as a rotational center of the shift lock cam.

The shift lock release lever may include a lever body rotatably coupled to the shift lever housing, a first protruding rod protruding from the lever body and having a free end configured to be selectively coupled to the shift lever body, a second protruding rod protruding from the lever body and having a free end configured to be eccentrically coupled to the position converting member of the shift lock cam.

The lever body may be coupled to the shift lever housing by a hinge shaft, while functioning as a rotational center.

The free end of the second protruding rod may have a rod protrusion configured to be inserted into the position converting member of the shift lock cam, the rod protrusion integrally formed with the second protruding rod.

The free end of the first protruding rod may be slanted with a predetermined angle to form a wedge to increase a friction between the free end of the first protruding rod and the shift lever body.

A support protrusion may protrude from the lever body to couple the second elastic member and the shift lever housing.

The first elastic member may be a torsion spring.

The second elastic member may be a torsion spring.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

According to various embodiments of the present invention, as shown in FIGS. 1 to 6, an end of a shift lock cable 3 is connected to a brake pedal 1 and the other end of shift lock cable 3 is connected to a shift lock cam 10 combined with a shift lever housing 5.

Figure 1:
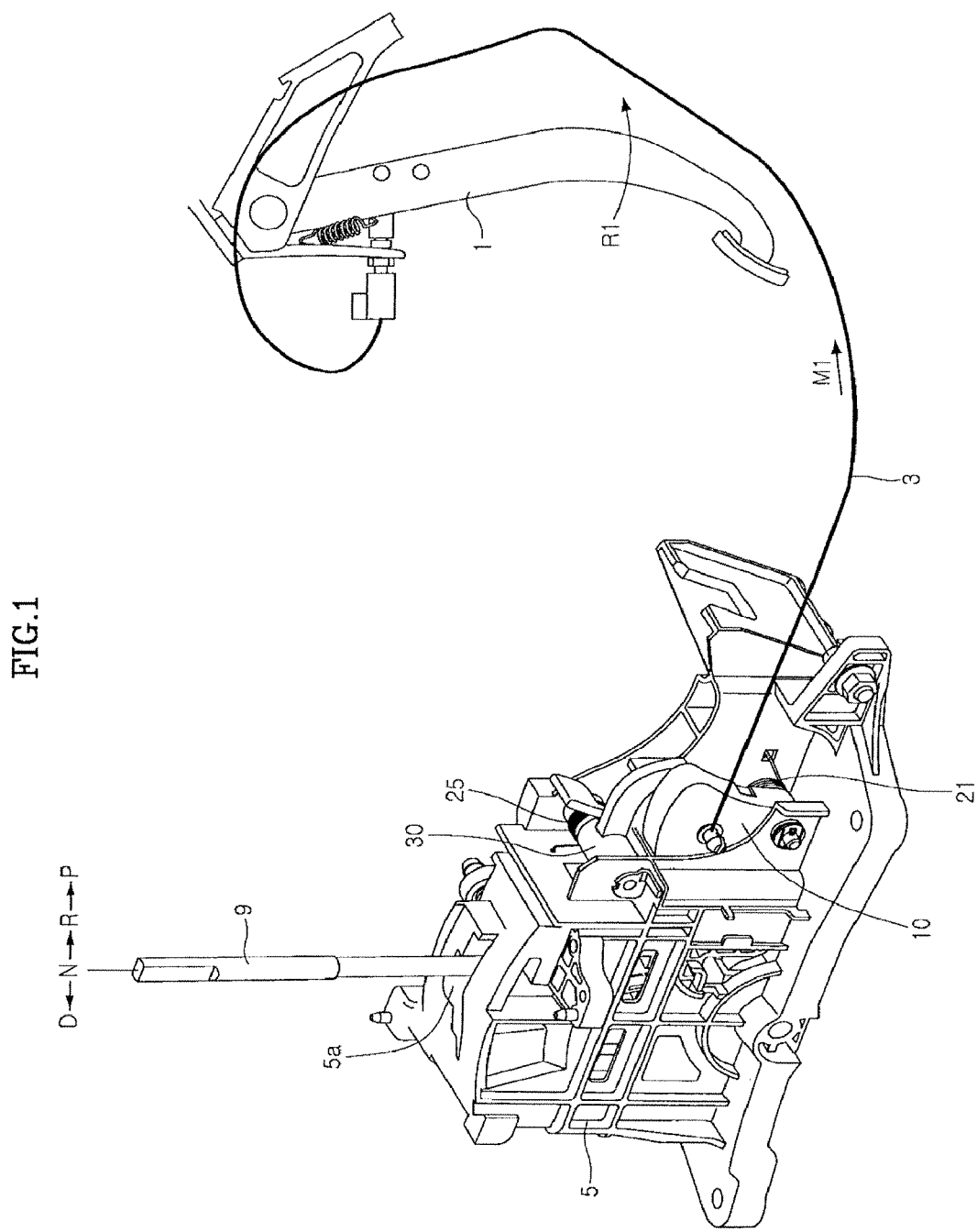
FIGS. 1 to 5 are views showing an exemplary mechanical apparatus for locking a shift lever according to the present invention.
Figure 2:
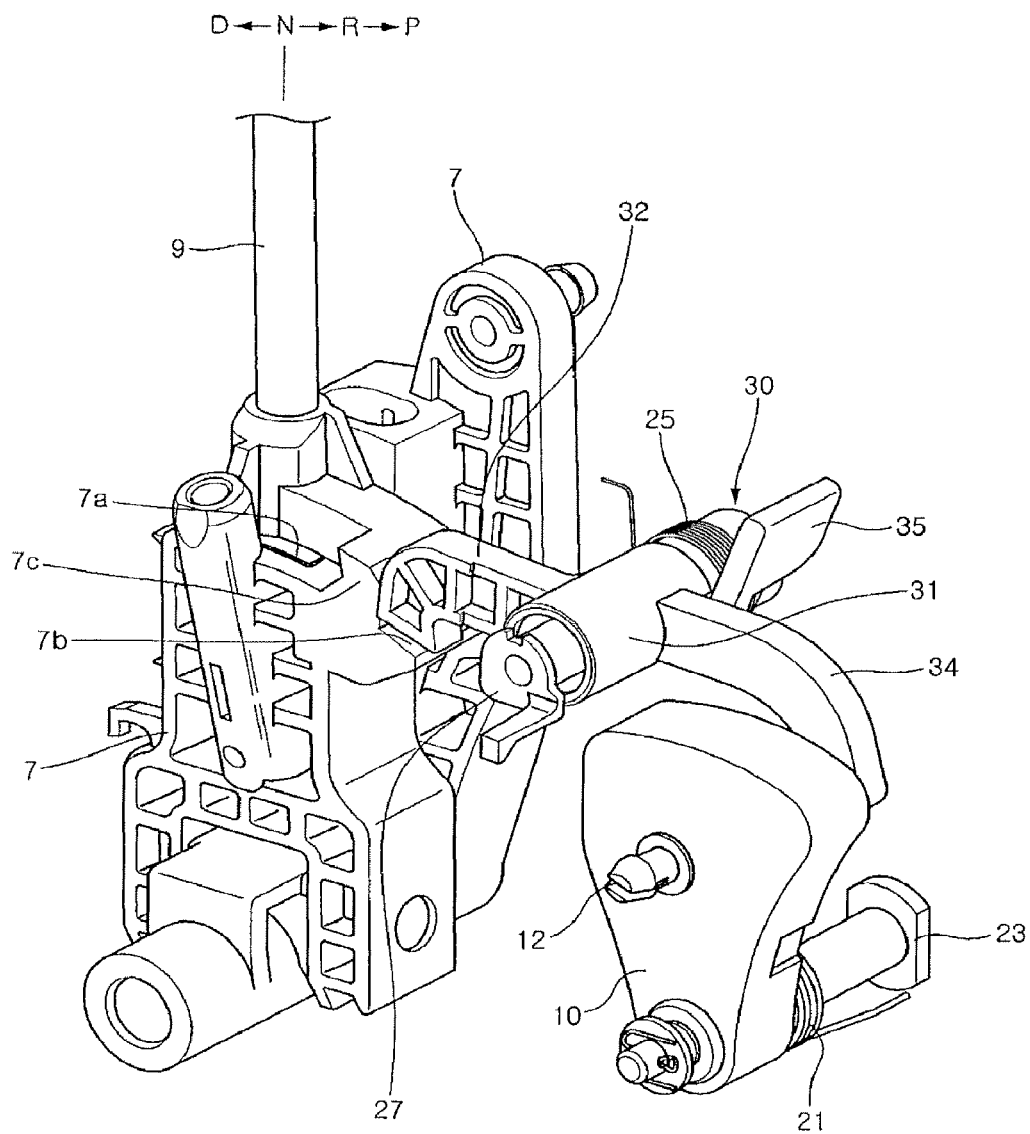
Figure 3:
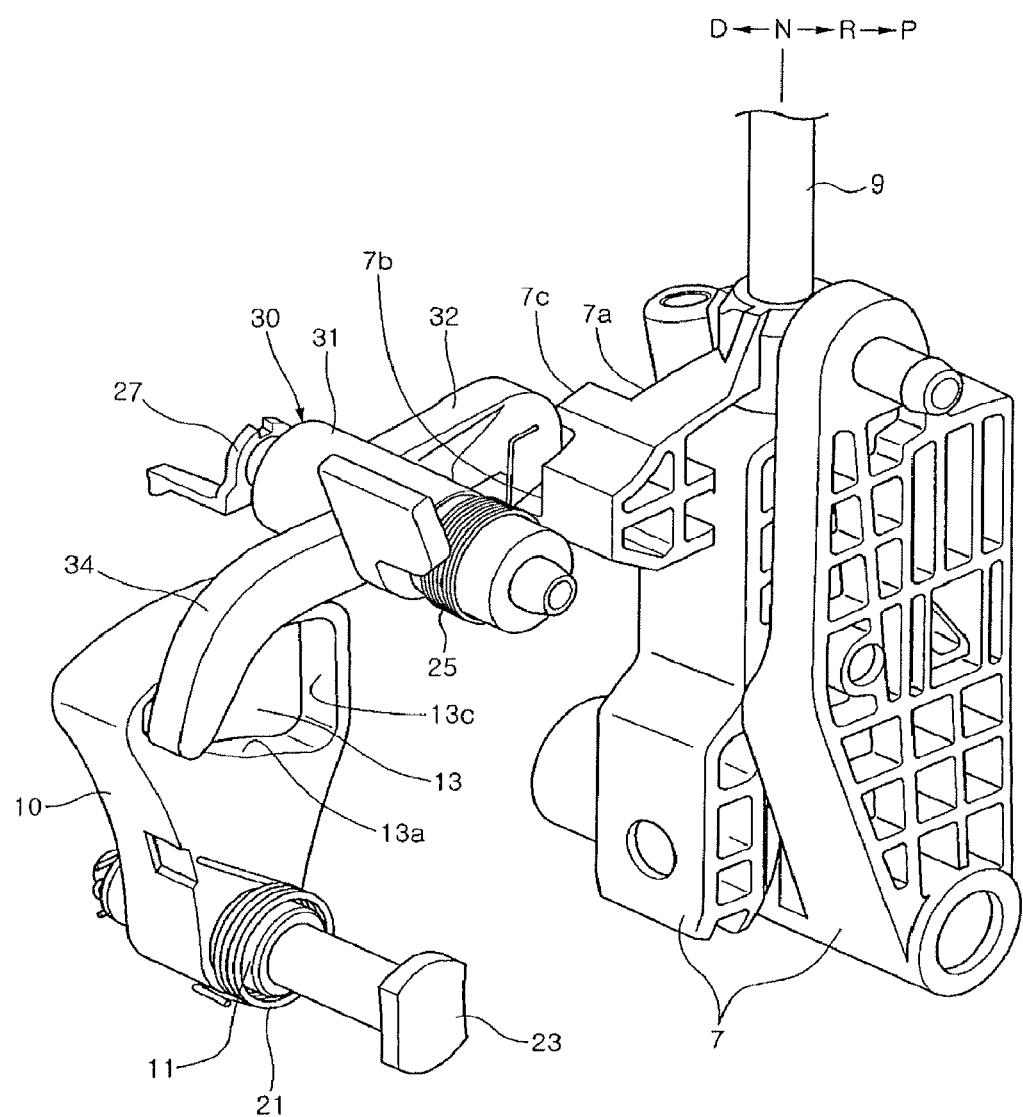
Figure 4:
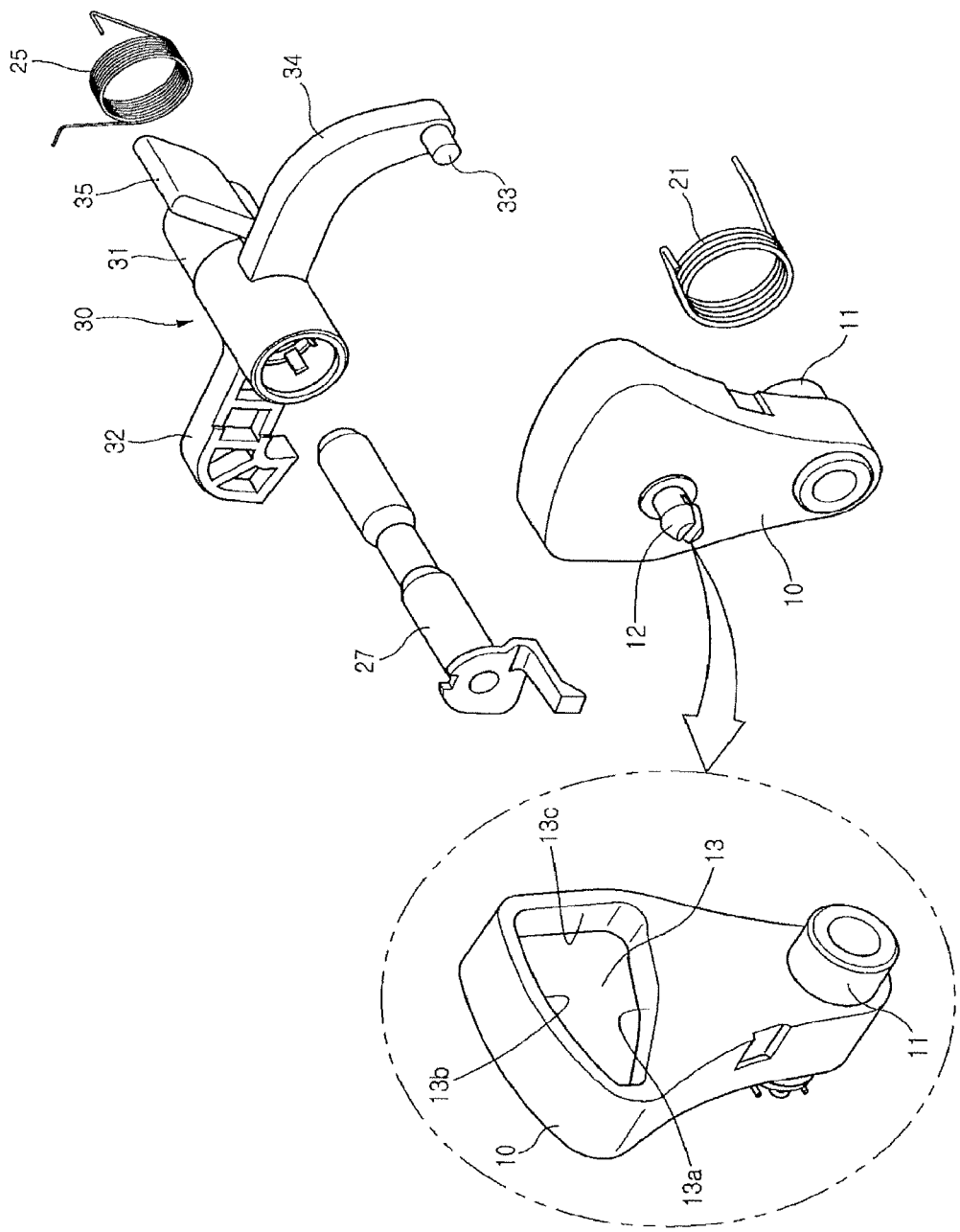
Figure 5:
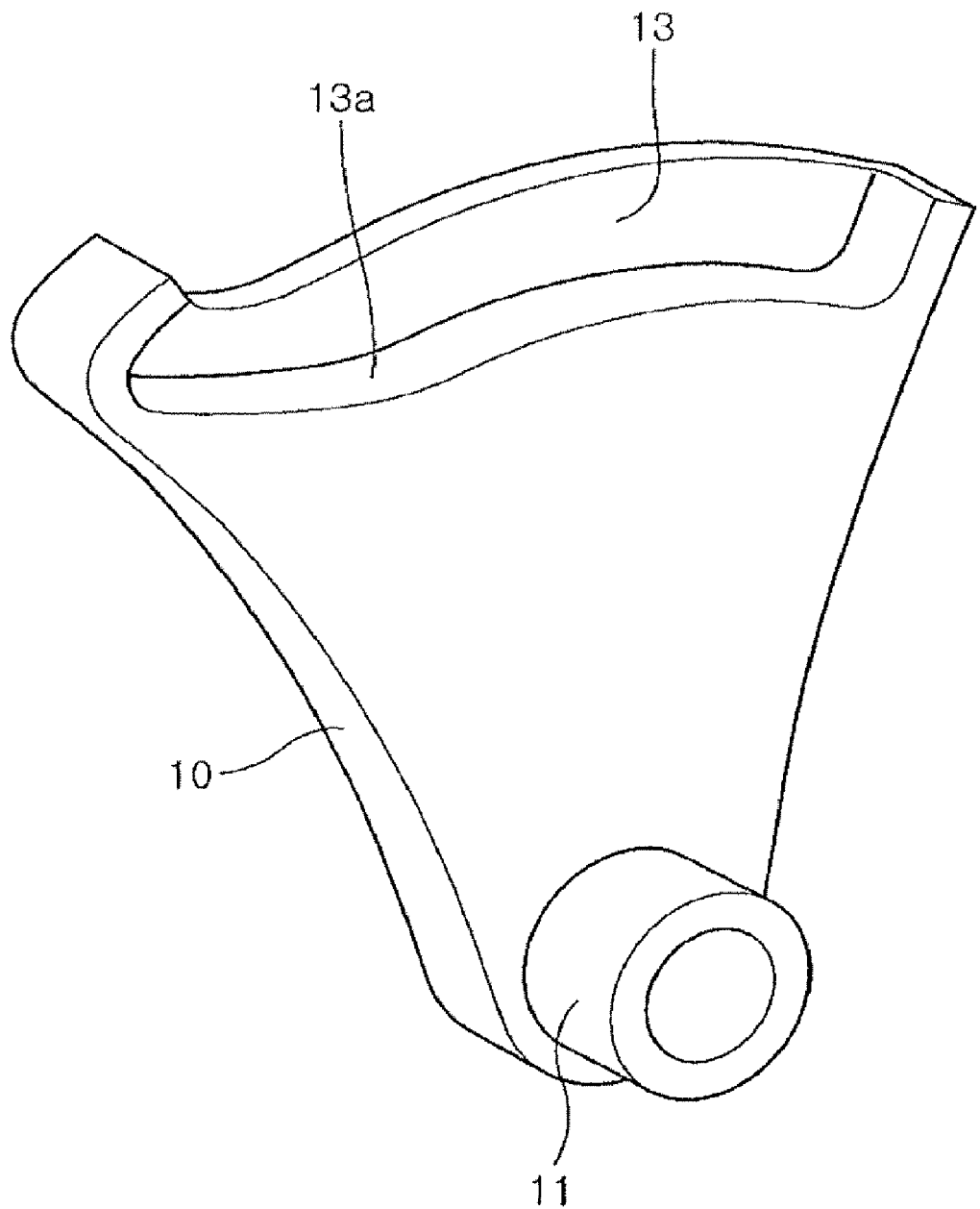

Shift lock cable 3 is fixed to shift lever housing 5 by a fixing member and is pulled toward brake pedal 1 in the direction of an arrow M1 as a driver presses down brake pedal 1 and brake pedal 1 correspondingly pivots in the direction of an arrow R1 shown in FIG. 1.

A range groove 5a is formed in shift lever housing 5 such that a P (parking)-range, an R (reverse)-range, an N (neutral)-range, and a D (drive)-range are sequentially connected.

A shift lever body 7 is rotatably combined with shift lever housing 5 and a shift lever 9 protruding upward from shift lever housing 5 through range groove 5a is integrally formed with shift lever body 7.

As shift lever body 7 rotates, shift lever 9 is selectively positioned to the P (parking)-range, the R (reverse)-range, the N (neutral)-range, and the D (drive)-range while moving along range groove 5a.

A P-range insertion groove 7a and an N-range insertion groove 7b are sequentially formed across a partition wall 7c.

On the other hand, shift lock cam 10 connected with shift lock cable 3 is combined with shift lever housing 5 and can elastically rotate by a cam spring 21.

That is, shift lock cam 10 has: a cam rotary shaft 11 that protrudes from a side such that cam spring 21 is fitted on the outer circumference and a hinge bolt 23 inserted in shift lever housing 5 passes through the cam rotary shaft 11, while functioning as a rotational center; a cable connection protrusion 12 that protrudes from the opposite side to connect an end of shift lock cable 3; and a cam groove 13 that is formed recessed on the side where cam rotary shaft 11 is formed toward the opposite side such that the other end of a shift lock release lever 30, which is described below, is inserted.

Cam groove 13 may be formed recessed on the opposite side where cam rotary shaft 11 is not formed toward the side where cam rotary shaft 11 is formed.

Further, shift lock release lever 30 is combined with shift lever housing 5 and can be elastically rotated by a lever spring 25.

Shift lock release lever 30 has: a lever body 31 that is formed in a pipe shape such that lever spring 25 is fitted on the outer circumference and a hinge shaft 27 inserted in shift lever housing 5 passes through the lever body, while functioning as a rotational center; a first protruding rod 32 that protrudes from lever body 31 and has a free end bending in an L-shape and inserted into P-range insertion groove 7a or N-range insertion groove 7b of shift lever body 7; a second protruding rod 34 that protrudes from lever body 31 and has a free end having an integrally formed rod protrusion 33 inserted in cam groove 13 of shift lock cam 10; and a spring support protrusion 35 that protrudes from lever body 31 to elastically support an end of lever spring 25 fitted on lever body 31.

Cam groove 13 of shift lock cam 10 is formed recessed in a track shape on a side of shift lock cam 10 according to various embodiments of the present invention, having a lower guide surface 13a formed in an arc shape along the rotational radius of rod protrusion 33 of shift lock release lever 30 to contact with rod protrusion 33, an upper guide surface 13b formed in an arc shape along the rotational radius of shift rock cam 10 and having an end connected with lower guide surface 13a, to form a first portion 110 and a connecting surface 13c connecting the other end 120 of upper guide surface 13 with the end of lower guide surface 13a to form a second portion 130.

Connecting surface 13c may be formed toward shift lever body 7 or in the opposite direction.

Further, in other embodiments of the present invention, cam groove 13 may be formed to be open on the upper surface of shift lock cam 10, which has only curved lower guide surface 13a that contacts with rod protrusion 33 along the rotational radius of rod protrusion 33.

On the other hand, cam spring 21 is a torsion spring wound in a circular shape, in which the circularly-wound portion is fitted on cam rotary shaft 11 of shift lock cam 10, and of which an end is supported and fixed to shift lever housing 5 and the other end is supported and fixed to the outer circumference, which does not face shift lever body 7, of shift lock cam 10.

Figure 6:
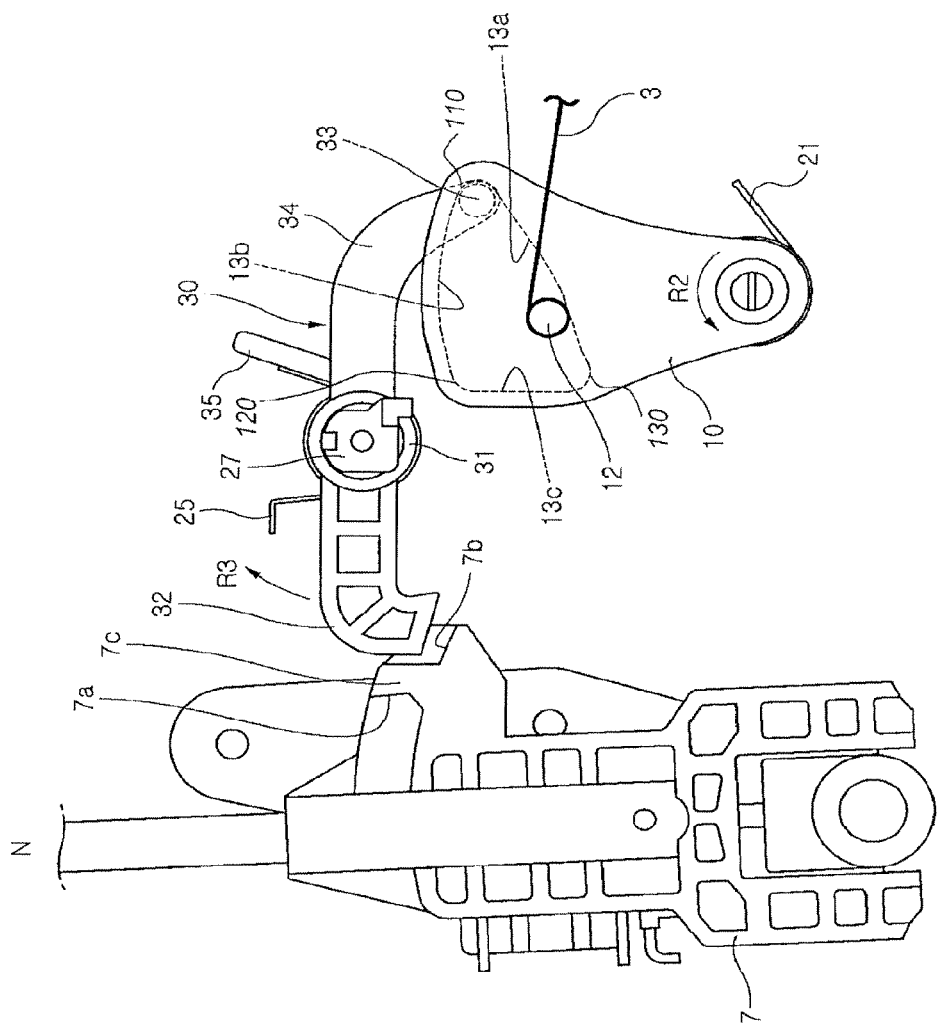
FIGS. 6 to 9 are views illustrating an exemplary operation of the apparatus for locking a shift lever according to the present invention.

Therefore, cam spring 21 provides rotational force to shift lock cam 10 such that shift lock cam 10 can rotate toward shift lever body 7, that is, as indicated by an arrow R2 in FIG. 6, connecting surface 13c can rotate toward shift lever body 7.

Further, lever spring 25 is also a torsion spring wound in a circular shape in which the circularly-wound portion is fitted on lever body 31 of shift lock release lever 30, and of which an end is supported and fixed to shift lever housing 5 and the other end is supported and fixed to a side facing shift lever body 7 of spring support protrusion 35.

Therefore, lever spring 25 provides rotational force to shift lock release lever 30 such that the free end of first protruding rod 32 of shift lock release lever 30 can rotate to be lifted from shift lever body 7, such as in the direction of an arrow R3 shown in FIG. 6.

The operation of various embodiments of the present invention is described hereafter.

In the position shown in FIG. 6, shift lever 9 is positioned at the N-range, first protruding rod 32 of shift lock release lever 30 is inserted in N-range insertion groove 7b of shift lever body 7, and a driver does not press down brake pedal 1.

Further, rod protrusion 33 of second protruding rod 34 is positioned at the joint of lower guide surface 13a and upper guide surface 13b in cam groove 13, such that the rotation of shift lock cam 10 in the direction of an arrow R2 by the elastic force of cam spring 21 and the rotation of shift lock release lever 30 in the direction of an arrow R3 by the elastic force of lever spring 25 are impossible.

Further, in the position shown in FIG. 6, shift lever body 7 cannot rotate in the shift direction of N→R→P unless the driver presses down brake pedal 1, such that shift lever 9 correspondingly cannot rotate in the shift direction of N→R→P.

This is because partition wall 7c of shift lever body 7 prevents shift lever body 7 from rotating in the shift direction of N→R→P while the free end of first protruding rod 32 is inserted in N-range insertion groove 7b.

Figure 7:
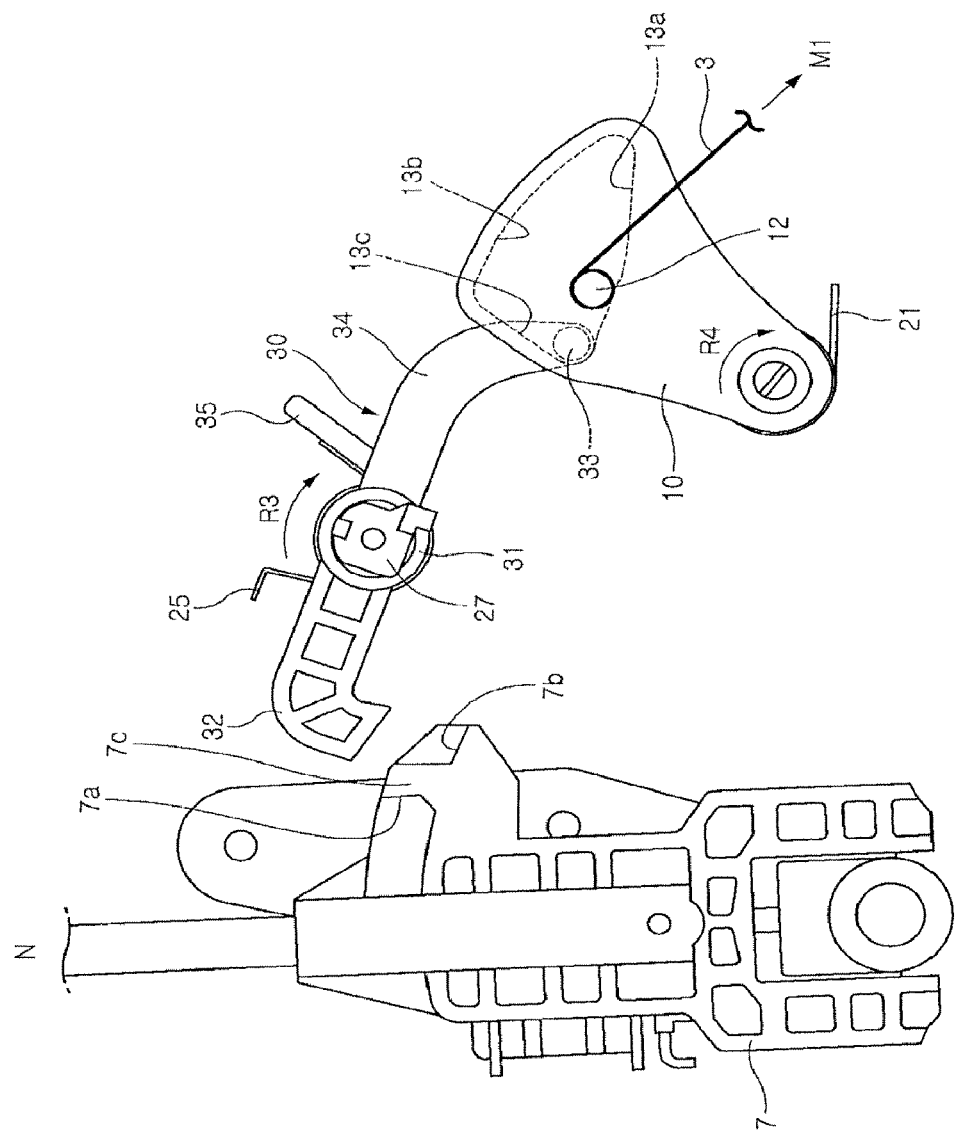

In the position shown in FIG. 6, as the driver presses down brake pedal 1 and brake pedal 1 pivots in the direction of an arrow R1 shown in FIG. 1, shift lock cable 3 is pulled in the direction of an arrow M1 shown in FIG. 7 and shift lock cam 10 rotates in the direction of an arrow R4 shown in FIG. 7.

As shift lock cam 10 rotates in the direction of R4 by the force supplied from the shift lock cable 3, the vertical location of the rod protrusion 33 is lowered as the rod protrusion 33 follows the lower guide surface 13a. Accordingly, the shift lock release lever 30 is rotated in the direction of an arrow R3 by the elastic force of lever spring 25 and the free end of first protruding rod 32 in N-range insertion groove 7b is pulled out of N-range insertion groove 7b.

Meanwhile, as shift lock release lever 30 is rotated in the direction of an arrow R3 by the elastic force of lever spring 25, rod protrusion 33 of second protruding rod 34 moves along lower guide surface 13a and fixed to the joint of lower guide surface 13a and connecting surface 13c.

When the free end of first protruding rod 32 of shift lock release lever 30 is pulled out of N-range insertion groove 7b, shift lever body 7 can rotate in the shift direction of N→R→P and shift lever 9 can also be shifted to N→R→P.

When the driver removes the foot from brake pedal 1 after shifting shift lever 9, shift lock cam 10 returns by the force of cam spring 21, shift lock release lever 30 returns by the force of lever spring 25, and shift lock cable 3 also returns by the return force of shift lock cam 10, thereby being ready to the next operation.

When shift lock release lever 30 returns, rod protrusion 33 of second protruding rod 34 moves along lower guide surface 13a and positions to the joint of lower guide surface 13a and upper guide surface 13b, as shown in FIG. 6.

Figure 8:
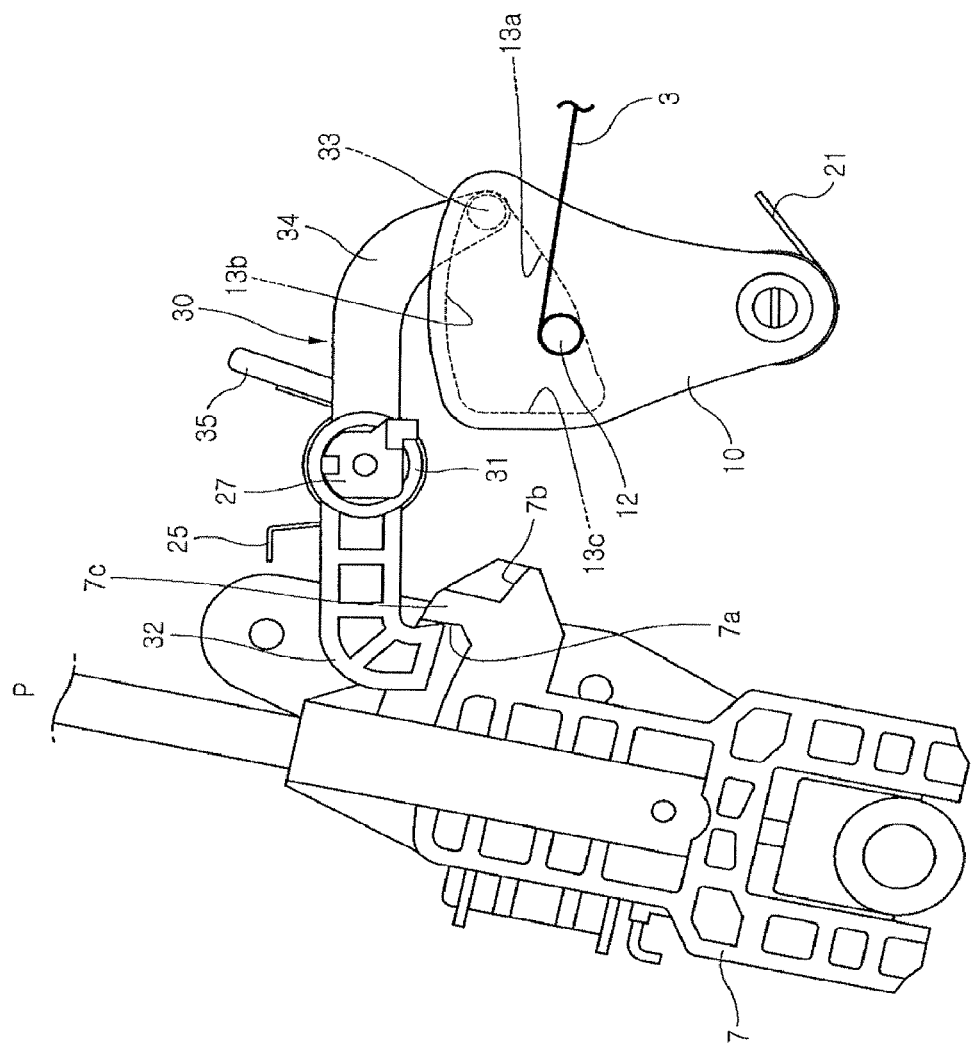

When the driver removes the foot from brake pedal 1 with shift lever at the P-range, the free end of first protruding rod 32 of shift lock release lever 30 is inserted into P-range insertion groove 7a, as shown in FIG. 8, such that shift lever body 7 cannot rotate in the shift direction of P→R→N unless the driver presses down brake pedal 1 and shift lever 9 cannot be shifted to P→R→N correspondingly.

In order to move shift lever 9 to P→R→N, the driver presses down again brake pedal 1 to repeat the above operation, which is not described herein.

It was described in the above that the driver should first press down brake pedal 1 and then operate shift lever 9 to shift to another range, with the free end of first protruding rod 32 of shift lock release lever 30 is inserted in P-range insertion groove 7a or the N-range insertion groove 7b.

However, the driver may first operate shift lever 9 and then nearly simultaneously press down brake pedal 1 by mistake.

When brake pedal 1 does not rotate in the direction of an arrow R1 shown in FIG. 1 even though the driver presses down brake pedal 1, the driver momentarily has a doubt of a problem in brake pedal 1, in which a novice driver may cause an accident in confusion.

In order to prevent the above situation, in various embodiments of the present invention has a structure that can smoothly rotate brake pedal 1 even if the driver first operate shift lever 9 to shift to another range and then nearly simultaneously presses down brake pedal 1, with the free end of first protruding rod 32 is inserted in P-range insertion groove 7a or N-range insertion groove 7b.

Figure 9:
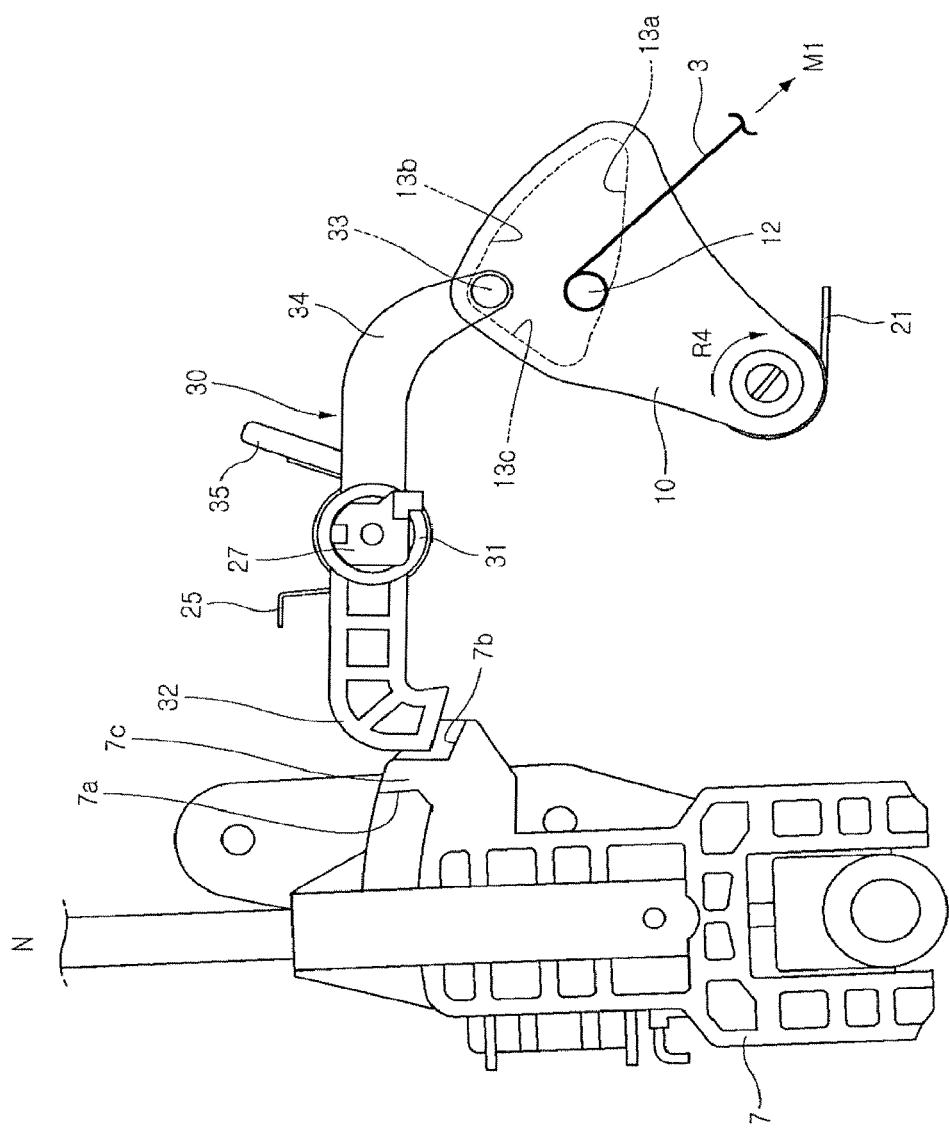

That is, as shown in FIG. 9, it is exemplified herein that a driver moves shift lever 9 to the P-range and then nearly simultaneously presses down brake pedal 1, for shift to the P-range, with the free end of first protruding rod 32 is inserted in N-range insertion groove 7b.

Even if the driver moves shift lever 9 to the P-range, shift lever body 7 does not rotate in the shift direction of N→R→P because the partition wall is in contact with the free end of first protruding rod 32, such that shift lever 9 is not moved to N→R→P.

In various embodiments of the present invention, the free end of the first protruding rod 32 may be slanted with a predetermined angle to form a wedge such that a friction between the free end of the first protruding rod 32 and the shift lever body 7 may be increased to be firmly held therebetween sufficiently enough to surmount the restoring force of the lever spring 25.

As shift lever 9 is first operated and then brake pedal 1 is pressed down, shift lock cam 10 is rotated in the direction of an arrow R4 by pulling force in the direction of an arrow M1 of shift lock cable 3.

In other words, shift lock cam 10 smoothly rotates in the direction of an arrow R4 even though shift lock release lever 30 cannot rotate in the direction of an arrow R3, and as a result, brake pedal 1 can smoothly pivot.

Therefore, when only shift lock cam 10 rotate while shift lock release lever 30 cannot rotate, rod protrusion 33 of second protruding rod 34 moves along upper guide surface 13b from the joint of lower guide surface 13a and upper guide surface 13b and is fixed to the joint of upper guide surface 13b and connecting surface 13c.

When shift lever 9 cannot be moved even though brake pedal 1 is pressed down, the driver can immediately know that the order of operation of brake pedal 1 and shift lever 9 is changed.

Therefore, the driver can safely drive the vehicle by operating again brake pedal 1 and shift lever 9 in the right order, thereby preventing unnecessary accidents.

As described above, in some embodiments of the present invention, the function of an apparatus for locking a shift lever that prevents P→R shift or N→R shift of shift lever is maintained unless the driver presses down brake pedal 1, such that it is possible to prevent an accident due to the driver's inattentiveness.

Further, according to the present invention, it is possible to prevent unnecessary accidents by having a structure that can smoothly pivot brake pedal 1 even if a driver first operates shift lever 9 and then nearly simultaneously presses down brake pedal 1 by small mistake.

Further, since the apparatus for locking a shift lever according to various embodiments of the present invention has a mechanical structure that can be manufactured at a low cost and does not practically make a noise, it is possible to apply the apparatus to all types of vehicle, regardless of cost.

For convenience in explanation and accurate definition in the appended claims, the terms, "upper" and "lower," are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for locking a shift lever of an automatic transmission in a vehicle, comprising:
    a shift lock cam including a position converting member and being connected with a brake pedal wherein the shift lock cam is pivotally coupled to a shift lever housing and elastically supported by a first elastic member; and
    a shift lock release lever that is pivotally coupled to the shift lever housing and elastically supported by a second elastic member,
    wherein one end of the shift lock release lever is selectively coupled to a shift lever body and the other end of the shift lock release lever is eccentrically coupled to the position converting member of the shift lock cam;
    wherein the first elastic member provides an elastic force to the shift lock cam in opposite direction of the shift lever body;
    wherein the second elastic member provides an elastic force to the shift lock release lever toward the shift lock cam;
    wherein the position converting member includes a first portion, a second portion and a connection portion, the first portion being configured to be disposed higher than the connection portion when the brake pedal is not applied but the second portion being configured to be disposed higher than the connection portion when the brake pedal is applied;
    wherein the second portion is disposed in rearward direction of the connecting portion toward the shift lever body and the first portion is disposed opposite the second portion with respect to the connecting portion;
    wherein the connection portion is coupled to the brake pedal;
    wherein the shift lock cam includes a cable connection protrusion that protrudes from a lateral surface thereof to be coupled to the brake pedal, the cable connection protrusion forming the connection portion;
    wherein the cable connection protrusion is coupled to the brake pedal by a shift lock cable; and
    wherein the position converting member is configured to be recessed in a track shape on the other lateral surface of the shift lock cam, the position converting member including:
    a lower guide surface and an upper guide surface, wherein one end of the lower guide surface and one end of the upper guide surface are connected to each other to form the first portion; and
    a connecting surface connecting the other end of the upper guide surface with the other end of the lower guide surface, wherein a joint connecting the other end of the lower guide surface and the connecting surface forms the second portion.

2. The apparatus as defined in claim 1, wherein the position converting member is configured to be recessed in a track shape on the other lateral surface of the shift lock cam and formed to be open on an upper surface of the shift lock cam and has a lower guide surface, both distal ends of which include the first and second portions respectively.

3. The apparatus as defined in claim 1, wherein the shift lock cam includes:
    a cam rotary shaft protruding from a side thereof such that the second elastic member is fitted on outer circumference of the cam rotary shaft; and
    a hinge bolt passing through the cam rotary shaft and coupled to the shift lever housing, while functioning as a rotational center of the shift lock cam.

4. The apparatus an engine as defined in claim 1, wherein the shift lock release lever includes:
    a lever body rotatably coupled to the shift lever housing;
    a first protruding rod protruding from the lever body and having a free end configured to be selectively coupled to the shift lever body;
    a second protruding rod protruding from the lever body and having a free end configured to be eccentrically coupled to the position converting member of the shift lock cam.

5. The apparatus an engine as defined in claim 4, wherein the lever body is coupled to the shift lever housing by a hinge shaft, while functioning as a rotational center.

6. The apparatus an engine as defined in claim 4, wherein the free end of the second protruding rod has a rod protrusion configured to be inserted into the position converting member of the shift lock cam, the rod protrusion integrally formed with the second protruding rod.

7. The apparatus as defined in claim 4, wherein the free end of the first protruding rod is slanted with a predetermined angle to form a wedge to increase a friction between the free end of the first protruding rod and the shift lever body.

8. The apparatus an engine as defined in claim 4, wherein a support protrusion protrudes from the lever body to couple the second elastic member and the shift lever housing.

9. The apparatus as defined in claim 1, wherein the first elastic member is a torsion spring.

10. The apparatus as defined in claim 1, wherein the second elastic member is a torsion spring.

11. An automatic transmission comprising the apparatus as defined in claim 1.

12. A passenger vehicle comprising the apparatus as defined in claim 1.

* * * * *